United States Patent [19]

Watz

[11] Patent Number: 5,161,060
[45] Date of Patent: Nov. 3, 1992

[54] CAMERA LENS

[75] Inventor: Walter Watz, Huettenberg-Reiskirchen, Fed. Rep. of Germany

[73] Assignee: Leica Camera GmbH, Wetzlar, Fed. Rep. of Germany

[21] Appl. No.: 656,411

[22] Filed: Feb. 15, 1991

[30] Foreign Application Priority Data

Feb. 20, 1990 [DE] Fed. Rep. of Germany ....... 4005300

[51] Int. Cl.$^5$ .............................................. G02B 9/60
[52] U.S. Cl. ...................................... 359/642; 359/765
[58] Field of Search ....................... 359/642, 765, 764

[56] References Cited

U.S. PATENT DOCUMENTS

| | | | |
|---|---|---|---|
| 4,477,154 | 10/1984 | Sato | 359/764 |
| 4,576,448 | 3/1986 | Ikari | 359/764 |
| 4,659,190 | 4/1987 | Mihara | 350/432 |
| 4,838,670 | 6/1989 | Ueda et al. | 359/764 |

FOREIGN PATENT DOCUMENTS 3523611 1/1986 Fed. Rep. of Germany .
3633032 6/1987 Fed. Rep. of Germany .

Primary Examiner—Janice A. Howell
Assistant Examiner—Richard Hanig
Attorney, Agent, or Firm—Foley & Lardner

[57] ABSTRACT

A camera lens with a relative aperture of 1:1.4 and a focal length of 35 mm has five components. The first component includes a cemented element which is concave on the object side. The second component includes a cemented element which has an aspherical convex surface on the object side. The third component serves as an individual lens. The fourth component includes a cemented element which is concave on the object side. The fifth component has a cemented element which includes a concave surface on the image side and an aspherical convex surface on the object side.

4 Claims, 3 Drawing Sheets

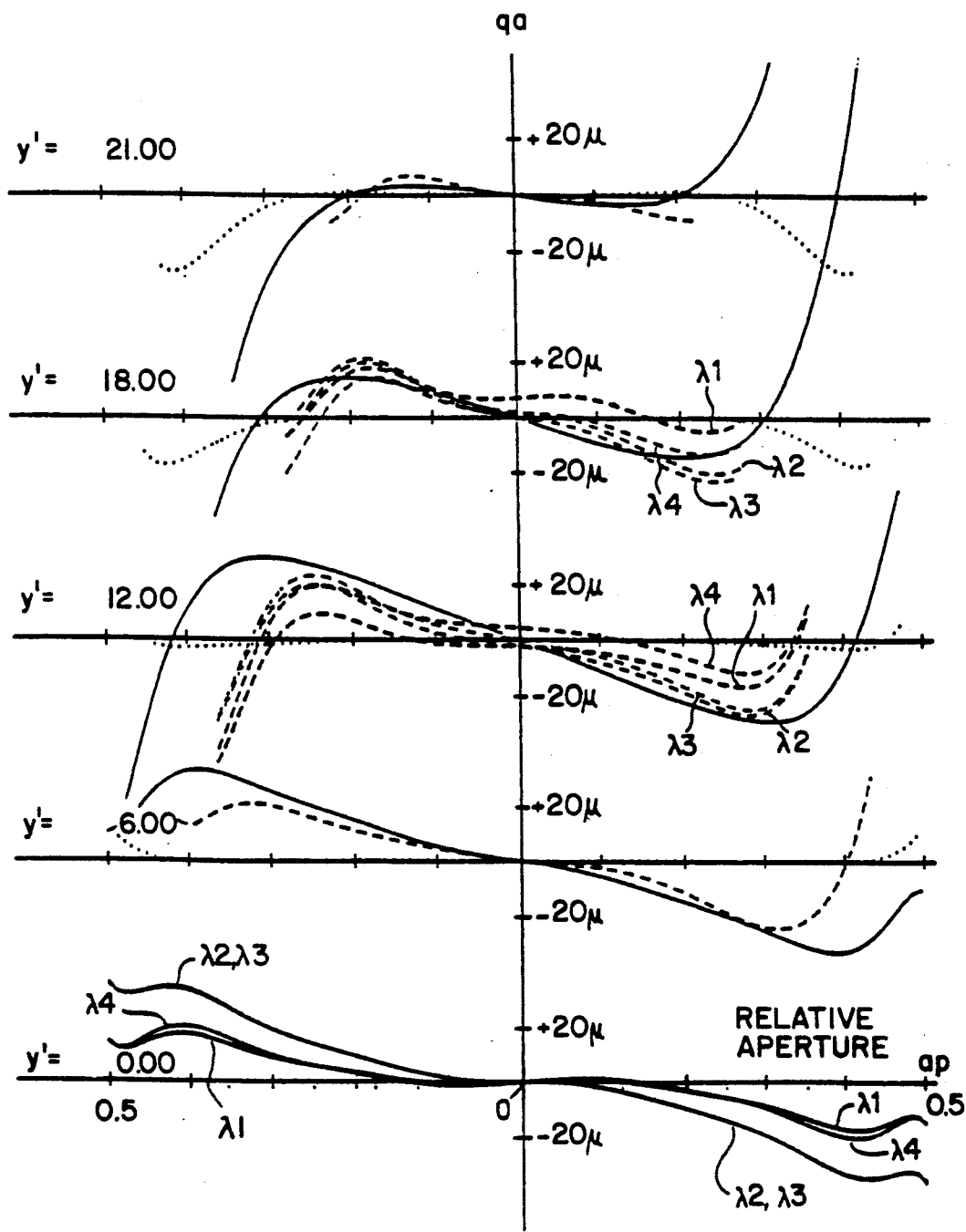

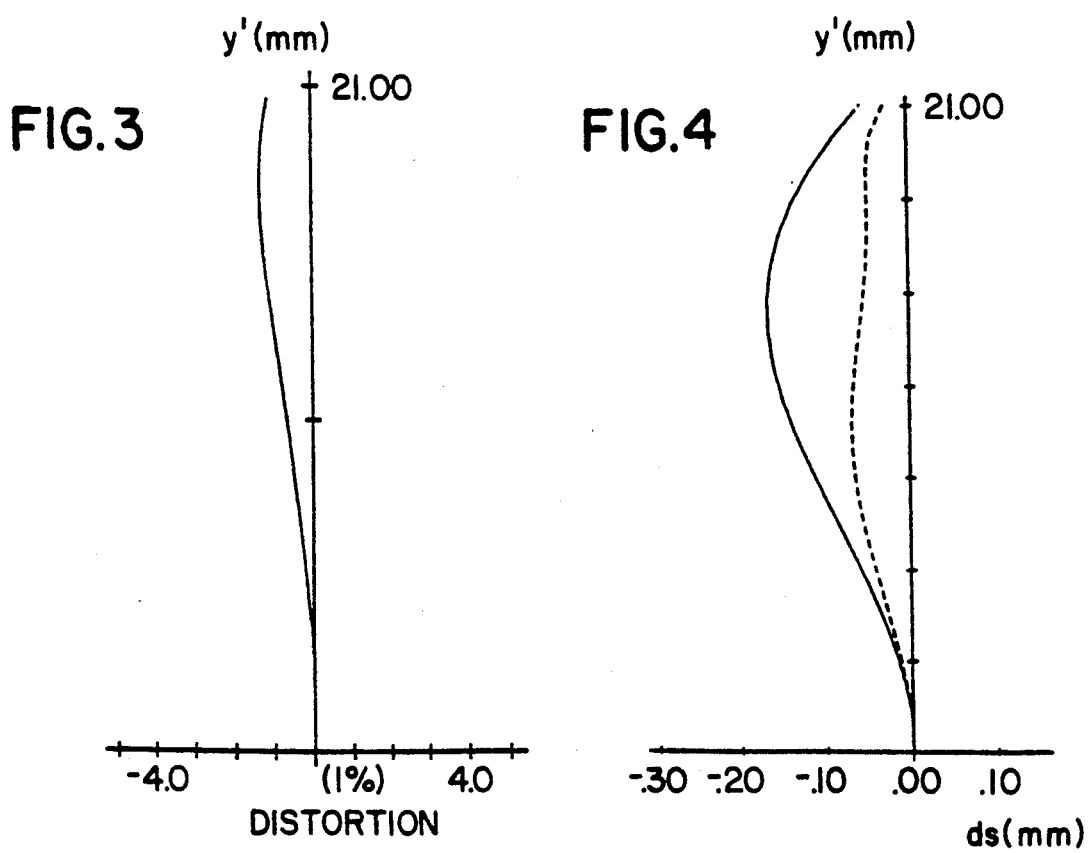
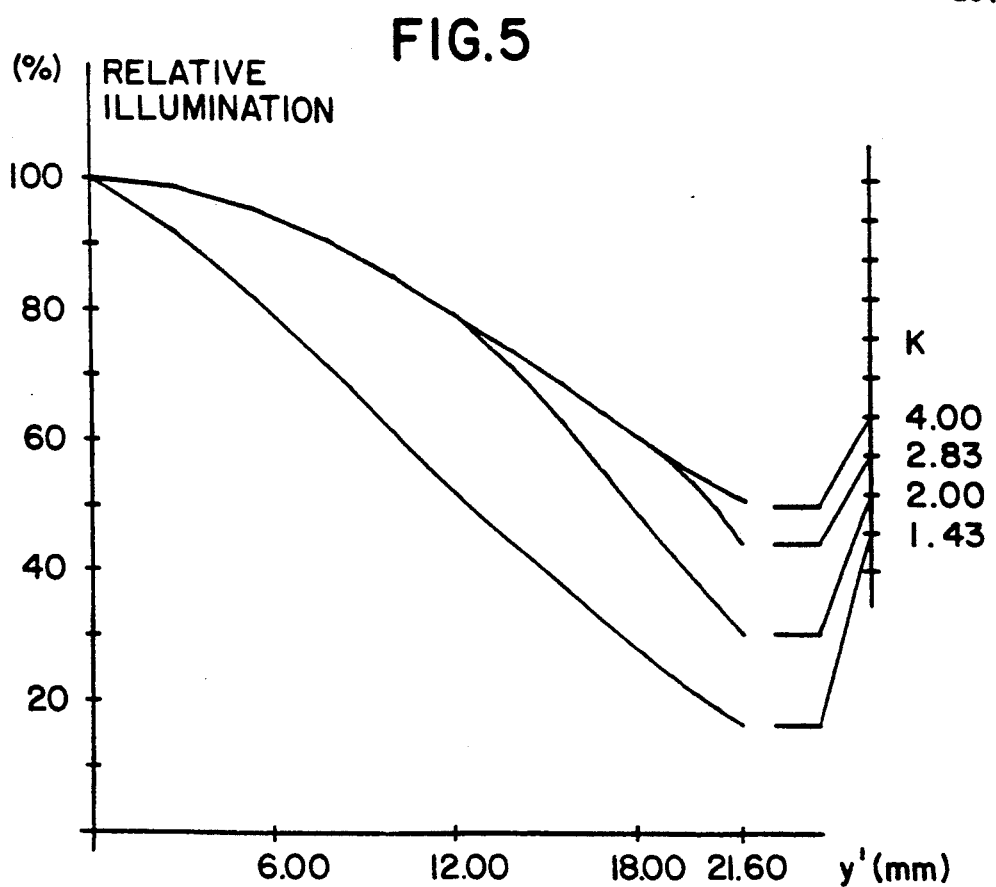

CAMERA LENS

BACKGROUND OF THE INVENTION

The invention is directed to a lens suitable for use as a camera lens having a relative aperture of 1:1.4 and a focal length of 35 mm. Lenses with a relative aperture of 1:1.4 and a focal length of 35 mm are known and available, for example, under the name of Summilux M 1.4/35 mm, order no. 11870, from the firm of Leica GmbH.

There is known from German Publication 35 23 611, published Jan. 23, 1986, a lens for a compact camera for 35 mm film having a meniscus which diverges on the image side and has an aspherical lens surface.

In the 35 23 611 device, the meniscus is concave on the object side and the lens surface on the image side is convex and aspherical in shape. Lenses are disclosed which have correction for a relative aperture of 1:2.8 and 1:3.5. Also disclosed in the 35 23 611 publication is the use of two aspherical shapes for such lenses, which are arranged as one element, before or after the diaphragm, of the lens.

German Offenlegungsschrift 36 33 032, published Jun. 25, 1987, discloses a lens, which includes five components made from seven spherical lenses, having a relative aperture of 1:1.4 with good correction. In the 36 33 032 device, the fifth component must be moved with respect to the first four components for focusing.

SUMMARY OF THE INVENTION

It is an object of the instant invention to improve the image quality of a lens which has a relative apertures of 1:1.4 and a focal length of 35 mm by using aspherical surfaces, particularly in marginal areas of the image.

According to a first aspect of the invention there is provided a camera lens which has a relative aperture of 1:1.4 and a focal length of 35 mm. The camera lens includes a first component having a cemented element which is concave on the object side, and a second component having a cemented element which has an aspherical convex surface on the object side. The camera lens also includes a diaphragm and a third component which serves as an individual lens. A fourth component includes a cemented element which is concave on the object side. A fifth component has a cemented element which includes a concave surface on the image side and an aspherical convex surface on the object side.

Other objects, features, and advantages of the invention will be apparent from the following detailed description of preferred embodiments.

BRIEF DESCRIPTION OF THE DRAWINGS

The invention will be described in further detail below with reference to the drawings, wherein:

FIG. 2 illustrates transverse aberrations of the FIG. 1 preferred embodiment for various image heights;

FIG. 3 illustrates distortion for the FIG. 1 preferred embodiment;

FIG. 4 illustrates image field curvature for the FIG. 1 preferred embodiment; and FIG. 5 illustrates variation in the illumination level at various image heights for different diaphragm settings.

DETAILED DESCRIPTION OF THE PREFERRED EMBODIMENTS

Figure 1:
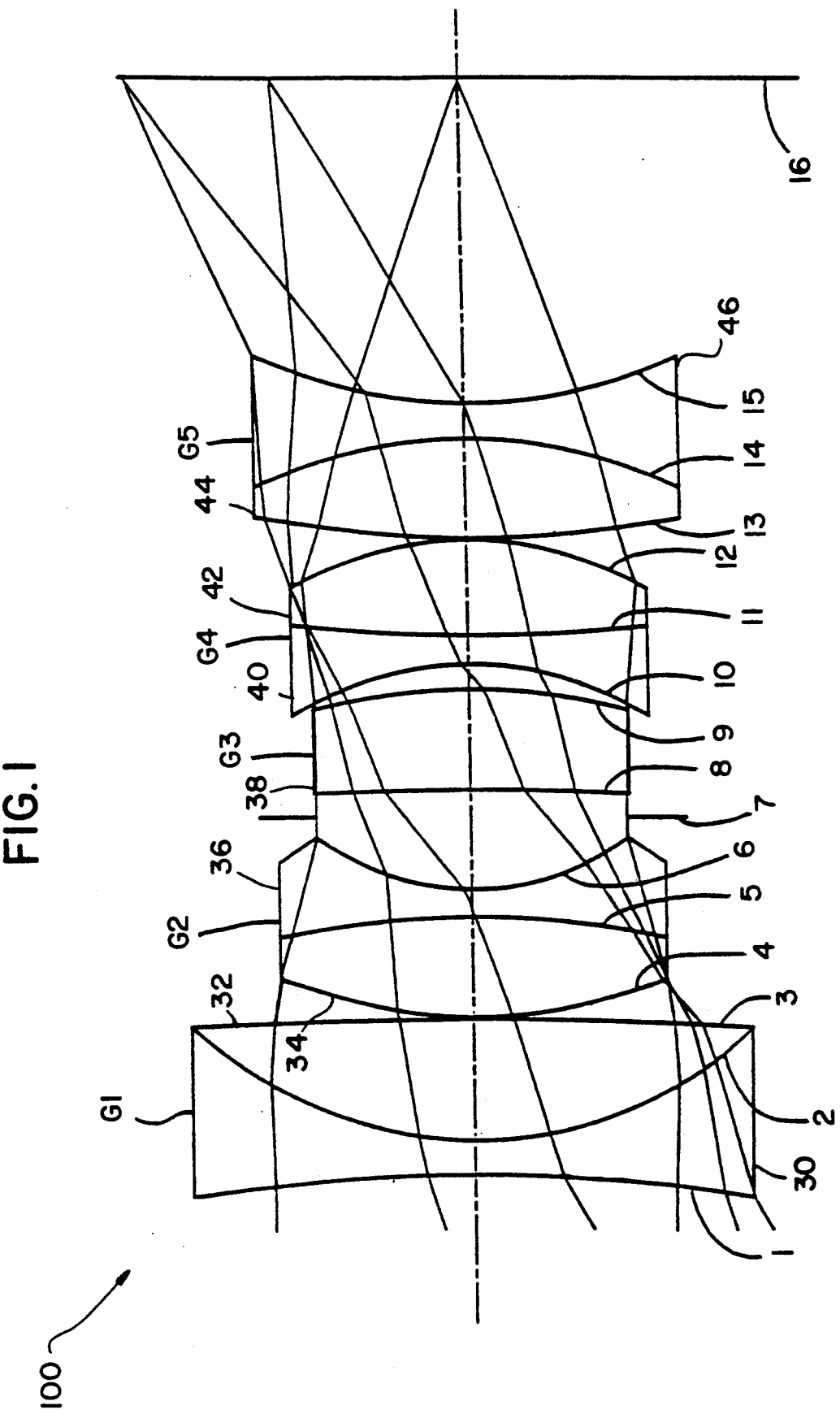
FIG. 1 illustrates a sectional view of a preferred embodiment of the instant invention.

The invention is based on the realization that the introduction of aspherical lenses alone is not sufficient to lead to success in achieving good correction in marginal areas of an image. It has been discovered that, surprisingly, additionally providing the respective outermost surfaces of a lens with a concave shape leads to an improvement in the marginal areas. This realization represents a fundamental departure from conventional Gaussian optics. In the invention the first and fifth components can then be implemented as cemented elements as a flanking measure to improve the image near the edges.

The use of two convex aspherical lenses eliminates the need to use aspherical forms which are more problematic in terms of production engineering. The design of the instant invention eliminates the need for concave aspherical lenses that would otherwise be required, for example, when providing an aspherical lens at the third component.

FIG. 1 illustrates a preferred embodiment of the instant invention. In FIG. 1, G1 to G5 respectively denote five components of a lens 100. In FIG. 1 the refracting surfaces are numbered from 1 to 6 and from 8 to 15. The lens 100 also includes a diaphragm 7. The image plane is designated by numeral 16.

The first component G1 is a cemented element which includes lenses 30 and 32 and which is concave on the object side, and has positive refractive power. The second component G2 is a cemented element which includes lenses 34 and 36 and which is convex on the object side, and has negative refractive power. Second component G2 includes convex lens surface 4, which is aspherical. Aperture diaphragm 7 is located in the gap following second component G2.

The third component G3 is a meniscus 38. Third component G3 is concave on the object side, and has positive refractive power. The fourth component G4 is a cemented element which includes lenses 40 and 42. Fourth component G4 is concave on the object side, and has positive refractive power. The fifth component G5 is a cemented element which includes lenses 44 and 46. Fifth component G5 is convex on the object side and has negative refractive power. Fifth component G5 includes convex lens surface 13 which is aspherical.

With a focal length f of 35 mm, an intercept distance of 19 mm and a minimum stop number of K=1.4, the lens 100 is suitable for use as a rapid wide-angle lens for miniature cameras.

Construction data for the FIG. 1 preferred embodiment are set forth in the following table:

| focal length f = 35 mm | | relative aperture K = 1.4 | | field of view 2σ = 64° | |
|---|---|---|---|---|---|
| Lens | Lens Surface No. | Radius | Thickness of Lens or Separation From Next Element | $n_e$ | $v_e$ |
| 30 | 1 | −110.114 | 2.010 | 1.503 | 56.1 |
| 32 | 2 | 24.920 | 7.400 | 1.820 | 45.1 |
|  | 3 | −305.000 | 0.100 |  |  |
| 34 | 4 | 28.346 | 6.070 | 1.820 | 45.1 |
| 36 | 5 | −57.560 | 1.610 | 1.694 | 31.0 |
|  | 6 | 16.624 | 4.340 |  |  |
|  | 7 | Diaphragm | 1.660 |  |  |
| 38 | 8 | −197.204 | 6.070 | 1.792 | 47.2 |
|  | 9 | −38.628 | 1.500 |  |  |
| 40 | 10 | −21.142 | 1.720 | 1.652 | 33.6 |

-continued

| | | | | | |
|---|---|---|---|---|---|
| 42 | 11 | 101.985 | 5.860 | 1.820 | 45.1 |
| | 12 | −21.905 | 0.110 | | |
| 44 | 13 | 60.026 | 5.940 | 1.820 | 45.1 |
| 46 | 14 | −31.325 | 2.050 | 1.624 | 36.1 |
| | 15 | 31.325 | 19.595 | | |

In the table above, $n_e$ is the index of refraction of the glass and $v_e$ is the reciprocal of the dispersive power. The vertex radius is specified for lens surfaces No. 4 and No. 13. Surfaces No. 4 and No. 13 are aspherical according to the following formula for the sagitta p as a function of chord s:

$$p(s) = \sum_{n=1}^{6} K(n) \cdot \left(\frac{s^2}{2}\right)^n$$

with the following coefficients:

| Surface No. 4 | | Surface No. 13 | |
|---|---|---|---|
| K(1) | $0.35278 \cdot 10^{-1}$ | K(1) | $0.16659 \cdot 10^{-1}$ |
| K(2) | $-0.39034 \cdot 10^{-4}$ | K(2) | $-0.23435 \cdot 10^{-4}$ |
| K(3) | $-0.31407 \cdot 10^{-6}$ | K(3) | $0.32059 \cdot 10^{-7}$ |
| K(4) | $0.51317 \cdot 10^{-8}$ | K(4) | $0.20560 \cdot 10^{-9}$ |
| K(5) | $-0.67514 \cdot 10^{-10}$ | K(5) | $-0.55738 \cdot 10^{-11}$ |
| K(6) | $0.30151 \cdot 10^{-12}$ | K(6) | $0.23730 \cdot 10^{-13}$ |

The radii, thicknesses, air separations, and aspherical coefficients K(n) can be varied by at least ±10%, $n_e$ can be varied by at least ±0.05, and $v_e$ can be varied by at least ±5. As a result of this choice of coefficients for the aspherical lenses, the lens surface becomes increasingly flatter towards the edges. This feature facilitates mass production. In this design, the coefficient K(1) is precisely the inverse of the vertex radius.

The separation specified for the lens surface 15 is the separation from the image plane 16, that is, the intercept distance of the lens. The chord s is the separation of a point on the lens surface from the lens vertex.

The degree of correction achieved with the FIG. 1 preferred embodiment can be appreciated from FIGS. 2-5. In FIG. 2 a dotted line represents, for image heights y' equal to 0.00, 6.00, 12.00, 18.00, and 21.00, as a function of the relative aperture ap, the sagittal coma for a wavelength λ3 of 546 nm. Even at the edge of the image field at y' equal to 21.00, the sagittal coma is negligibly small over two thirds of the relative aperture ap.

Likewise, sagittal transverse aberration is plotted for wavelength λ3 as a continuous line. For y' equal to 0.00, this quantity, denoted as spherical aberration in this case, is also plotted for wavelengths of λ1 equal to 436 nm, λ2 equal to 480 nm, and λ4 equal to 644 nm. Plotted as dashes is the meridional transverse aberration for y' equal to 6.00 and 21.00 for λ3, and for y' equal to 12.00 and 18.00 for all four wavelengths λ1 to λ4.

For all image heights y' and wavelengths λ, aberration remains below 20 μm over a wide range of relative apertures ap, and is still relatively small even at the margin of the image field at y' equal to 21.00. Aberration can be approximated in a uniform linear fashion over large aperture ranges for all image heights, which leads to a further quality improvement to less than 7 μm in the best focusing plane.

FIG. 3 illustrates the resulting small distortion up to the edge of the image field for y' equal to 21.00. For y' equal to 6.00 distortion is −0.254%, for y' equal to 12.00 distortion is −0.871%, for y' equal to 18.00 distortion is −1.322%, and for y' equal to 21.00 distortion is −1.061%. The distortion curve is barrel-shaped.

FIG. 4 illustrates with dashes the resulting meridional field curvature, and with a continuous line the resulting sagittal field curvature. Meridional field curvature is virtually completely corrected by slight defocusing by −0.07 mm.

FIG. 5 illustrates for various low stop numbers K, the resulting good illumination, taking account of the $\cos^4$ law, of the image field up to the margin. This performance characteristic of the lens of the preferred embodiment is retained even at close ranges up to 0.7 m with a linear magnification of 1:17.5.

The foregoing description has been set forth to illustrate preferred embodiments of the invention and is not intended to be limiting. The preferred embodiments may be modified without departing from the scope of the invention. Since modification of the described embodiments incorporating the spirit and substance of the invention is possible, the scope of the invention should be limited solely with respect to the appended claims and equivalents.

What is claimed is:

1. A camera lens having a relative aperture of 1:1.4 and a focal length of 35 mm, said camera lens comprising:
   (a) a first component having a cemented element which is concave on an object side;
   (b) a second component having a cemented element which includes an aspherical convex surface on said object side;
   (c) a diaphragm;
   (d) a third component serving as an individual lens;
   (e) a fourth component having a cemented element which is concave on said object side; and
   (f) a fifth component having a cemented element which includes a concave surface on an image side and having an aspherical convex surface on said object side.

2. A camera lens as set forth in claim 1, wherein:
   (a) the refractive power of said first component is positive;
   (b) the refractive power of said second component is negative;
   (c) the refractive power of said third component is positive;
   (d) the refractive power of said fourth component is positive; and
   (e) the refractive power of said fifth component is negative.

3. A camera lens as set forth in claim 2, wherein said first component includes a first lens and a second lens, said second component includes a third lens and a fourth lens, said third component includes a fifth lens, said fourth component includes a sixth lens and a seventh lens, and said fifth component includes an eighth lens and a ninth lens, constructed according to the following data

| focal length | relative aperture | field of view |
|---|---|---|
| f = 35 mm | K = 1.4 | 2σ = 64° |

-continued

| Lens | Lens Surface No. | Radius | Thickness of Lens or Separation From Next Element | Lens Type Index of Refraction $n_e$ | Reciprocal of Dispersive Power $v_e$ |
|---|---|---|---|---|---|
| first lens | 1 | −110.1 | 2.01 | 1.503 | 56.1 |
| second lens | 2 | 24.9 | 7.40 | 1.820 | 45.1 |
|  | 3 | −305.0 | 0.10 |  |  |
| third lens | 4 | 28.3 | 6.07 | 1.820 | 45.1 |
| fourth lens | 5 | −57.6 | 1.61 | 1.694 | 31.0 |
|  | 6 | 16.6 | 6.00 |  |  |
| fifth lens | 8 | −197.2 | 6.07 | 1.792 | 47.2 |
|  | 9 | −38.6 | 1.50 |  |  |
| sixth lens | 10 | −21.1 | 1.72 | 1.652 | 33.6 |
| seventh lens | 11 | 101.0 | 5.86 | 1.820 | 45.1 |
|  | 12 | −21.9 | 0.11 |  |  |
| eighth lens | 13 | 60.0 | 5.94 | 1.820 | 45.1 |
| ninth lens | 14 | −31.3 | 2.05 | 1.624 | 36.1 |
|  | 15 | 31.3 | 19.60 |  |  | wherein lens surfaces No. 4 and No. 13 are aspherical according to the following formula for the sagitta p as a function of chord s $$p(s) = \sum_{n=1}^{6} K(n) \cdot \left(\frac{s^2}{2}\right)^n$$

with the following coefficients

| Surface No. 4 | | Surface No. 13 | |
|---|---|---|---|
| K(1) | $0.3528 \cdot 10^{-1}$ | K(1) | $0.1666 \cdot 10^{-1}$ |
| K(2) | $-0.3903 \cdot 10^{-4}$ | K(2) | $-0.2344 \cdot 10^{-4}$ |
| K(3) | $-0.3141 \cdot 10^{-6}$ | K(3) | $0.3206 \cdot 10^{-7}$ |
| K(4) | $0.5132 \cdot 10^{-8}$ | K(4) | $0.2056 \cdot 10^{-9}$ |
| K(5) | $-0.6751 \cdot 10^{-10}$ | K(5) | $-0.5574 \cdot 10^{-11}$ |
| K(6) | $0.3015 \cdot 10^{-12}$ | K(6) | $0.2373 \cdot 10^{-13}$ |

4. A camera lens as set forth in claim 2, wherein said first component includes a first lens and a second lens, said second component includes a third lens and a fourth lens, said third component includes a fifth lens, said fourth component includes a sixth lens and a seventh lens, and said fifth component includes an eighth lens and a ninth lens, constructed according to the following data

| | focal length $f = 35$ mm | relative aperture $K = 1.4$ | field of view $2\sigma = 64°$ | | |
|---|---|---|---|---|---|
| Lens | Lens Surface No. | Radius | Thickness of Lens or Separation From Next Element | Lens Type Index of Refraction $n_e$ | Reciprocal of Dispersive Power $v_e$ |
| first lens | 1 | −110.1 ± 10% | 2.01 ± 10% | 1.503 ± 0.05 | 56.1 ± 5 |
| second lens | 2 | 24.9 ± 10% | 7.40 ± 10% | 1.820 ± 0.05 | 45.1 ± 5 |
|  | 3 | −305.0 ± 10% | 0.10 ± 10% |  |  |
| third lens | 4 | 28.3 ± 10% | 6.07 ± 10% | 1.820 ± 0.05 | 45.1 ± 5 |
| fourth lens | 5 | −57.6 ± 10% | 1.61 ± 10% | 1.694 ± 0.05 | 31.0 ± 5 |
|  | 6 | 16.6 ± 10% | 6.00 ± 10% |  |  |
| fifth lens | 8 | −197.2 ± 10% | 6.07 ± 10% | 1.792 ± 0.05 | 47.2 ± 5 |
|  | 9 | −38.6 ± 10% | 1.50 ± 10% |  |  |
| sixth lens | 10 | −21.1 ± 10% | 1.72 ± 10% | 1.652 ± 0.05 | 33.6 ± 5 |
| seventh lens | 11 | 101.0 ± 10% | 5.86 ± 10% | 1.820 ± 0.05 | 45.1 ± 5 |
|  | 12 | −21.9 ± 10% | 0.11 ± 10% |  |  |
| eighth lens | 13 | 60.0 ± 10% | 5.94 ± 10% | 1.820 ± 0.05 | 45.1 ± 5 |
| ninth lens | 14 | −31.3 ± 10% | 2.05 ± 10% | 1.624 ± 0.05 | 36.1 ± 5 |
|  | 15 | 31.3 ± 10% | 19.60 ± 10% |  |  | wherein lens surfaces No. 4 and No. 13 are aspherical according to the following formula for the sagitta p as a function of chord s.

$$p(s) = \sum_{n=1}^{6} K(n) \cdot \left(\frac{s^2}{2}\right)^n$$

with the following coefficients

| Surface No. 4 | | Surface No. 13 | |
|---|---|---|---|
| K(1) | $0.3528 \cdot 10^{-1} \pm 10\%$ | K(1) | $0.1666 \cdot 10^{-1} \pm 10\%$ |
| K(2) | $-0.3903 \cdot 10^{-4} \pm 10\%$ | K(2) | $-0.2344 \cdot 10^{-4} \pm 10\%$ |
| K(3) | $-0.3141 \cdot 10^{-6} \pm 10\%$ | K(3) | $0.3206 \cdot 10^{-7} \pm 10\%$ |
| K(4) | $0.5132 \cdot 10^{-8} \pm 10\%$ | K(4) | $0.2056 \cdot 10^{-9} \pm 10\%$ |
| K(5) | $-0.6751 \cdot 10^{-10} \pm 10\%$ | K(5) | $-0.5574 \cdot 10^{-11} \pm 10\%$ |

-continued

| | Surface No. 4 | | Surface No. 13 |
|---|---|---|---|
| K(6) | $0.3015 \cdot 10^{-12} \pm 10\%$ | K(6) | $0.2373 \cdot 10^{-13} \pm 10\%$ | such that over an entire image field distortion is below −1.5 % and meridional field curvature is below 0.1 mm.

* * * * *